No. 821,290. PATENTED MAY 22, 1906.
S. HORR.
MILLING TOOL.
APPLICATION FILED NOV. 2, 1903.

2 SHEETS—SHEET 1.

Witnesses:—
Harold G. Bayett
William L. Hall

Inventor
Stephen Horr
by Poole & Brown
Attys.

No. 821,290. PATENTED MAY 22, 1906.
S. HORR.
MILLING TOOL.
APPLICATION FILED NOV. 2, 1903.
2 SHEETS—SHEET 2.
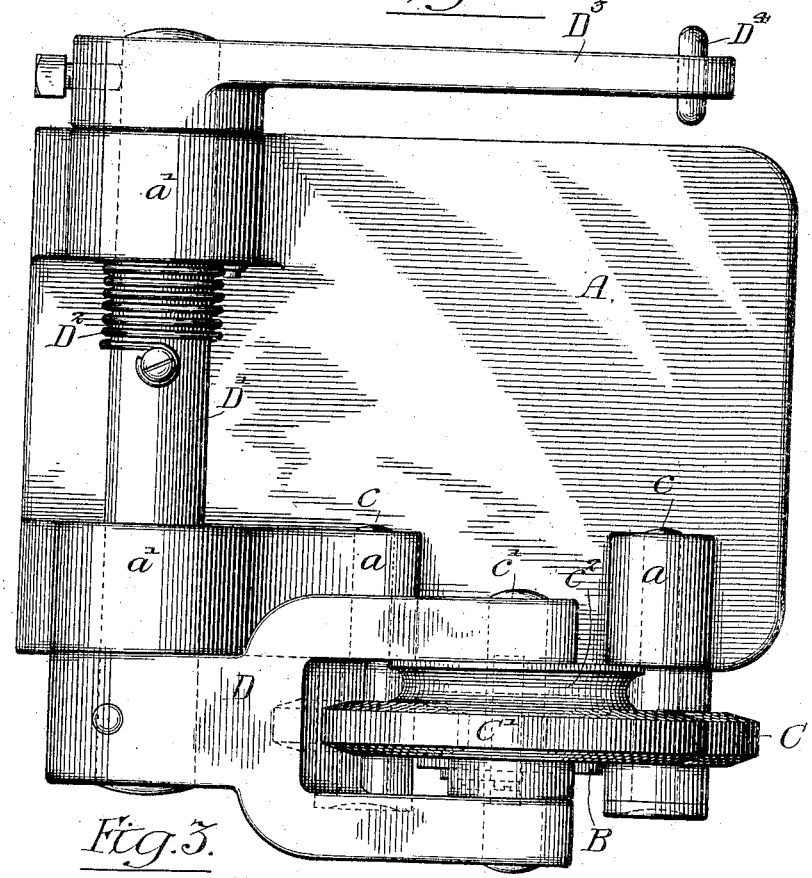
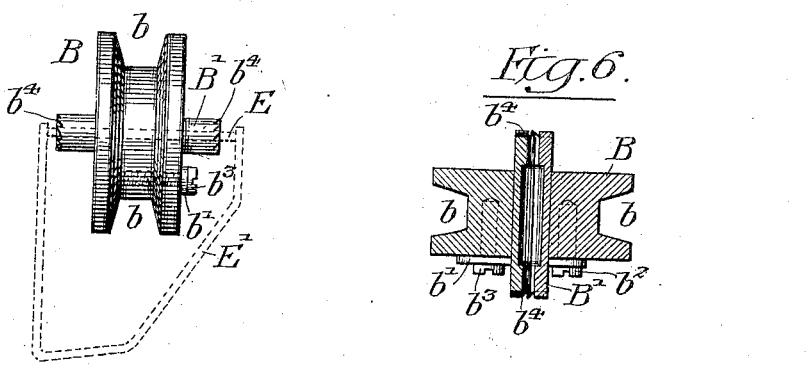
Witnesses:—
Harold G. Barrett
William H. Hall
Inventor
Stephen Horr
by:— Poole & Brown
Attys:

UNITED STATES PATENT OFFICE.

STEPHEN HORR, OF WOODSTOCK, ILLINOIS, ASSIGNOR TO THE OLIVER TYPEWRITER COMPANY, OF CHICAGO, ILLINOIS, A CORPORATION OF ILLINOIS.

MILLING-TOOL.

No. 821,290.  Specification of Letters Patent.  Patented May 22, 1906.

Application filed November 2, 1903. Serial No. 179,508.

*To all whom it may concern:*

Be it known that I, STEPHEN HORR, a citizen of the United States, residing at Woodstock, in the county of McHenry and State of Illinois, have invented certain new and useful Improvements in Milling-Tools; and I do hereby declare that the following is a full, clear, and exact description thereof, reference being had to the accompanying drawings, and to the letters of reference marked thereon, which form a part of this specification.

This invention relates to a novel milling device for milling the internal surfaces of articles the construction of which is such as to prevent the ready application thereto of a milling tool or device of ordinary or usual form.

The milling device herein shown has been designed more specifically for milling or finishing the internal surfaces of the looped type-bars of the Oliver type-writing machine at the places where the rock-shafts of such bars are attached to the arms thereof; but it is obvious that such milling device may be employed for milling or finishing other articles the contour of which is such as to render it impracticable to operate thereon with the existing forms of milling devices.

The invention consists in the matters hereinafter set forth, and more particularly pointed out in the appended claims.

Figure 1:
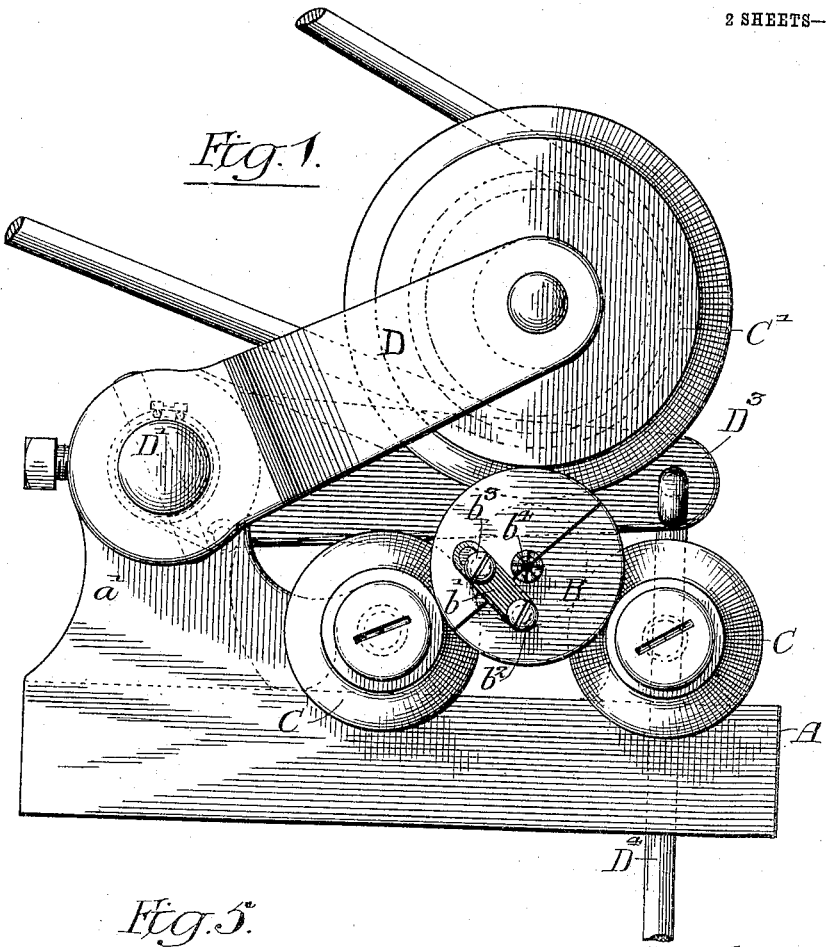
Figure 5:
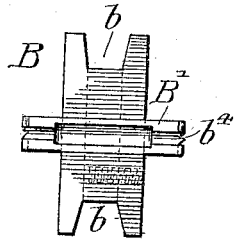
Figure 4:
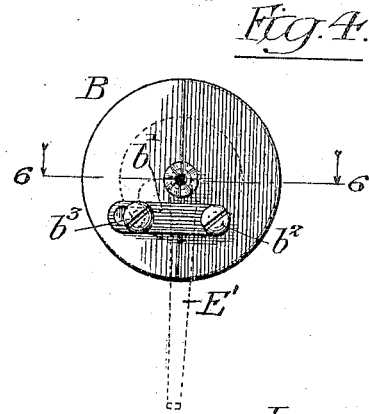

In the drawings, Figure 1 is a side elevation of the principal parts of a milling device or machine made in accordance with my invention. Fig. 2 is a top plan view thereof. Fig. 3 is a peripheral elevation of the milling-tool, showing a type-bar in position to be milled thereby. Fig. 4 is a side face view of said milling-tool. Fig. 5 is an inside elevation of one-half of said tool. Fig. 6 is an axial section of the tool, taken on line 6 6 of Fig. 4.

As shown in said drawings, A designates the flat base of the machine.

B designates a milling-tool which is made of disk form and is tubular or provided with a central bore to receive the work. The tool is constructed, as will hereinafter more fully appear, to permit the work to be inserted into the bore of the tool readily from the center thereof.

C C and C' designate three rotary disks, the two former of which are located side by side in the same plane and peripherally engage the milling-tool in a manner to support the same and the latter of which is located above in the same plane with the lower disks C and has peripheral engagement with said tool in a manner to hold the latter on the supporting-disks and to impart rotary motion thereto. Said driving-disk C is rotated through the agency of an endless belt $C^2$, engaging an annular groove in a reduced part or hub $c^2$ of said disk. The shafts $c\ c$ of the supporting-disks C are mounted in bearings $a$ at one side of the machine-base. The shaft $c'$ of the driving-disk C' is mounted in the free end of a forked arm D, which latter is rigidly fixed to a transverse horizontal rock-shaft mounted in bearings $a'$, rising from the rear end of the base-plate, whereby said forked arm and the upper or driving disk carried thereby may be moved toward and away from the lower supporting-disks to permit the tool to be inserted into and removed from its operative position in the machine.

The tool is herein shown as provided with a peripheral groove $b$, and the peripheries of the supporting-disks are suitably beveled to enter the peripheral groove of the tool, whereby after said tool has been inserted between the disks the grooved engagement of the tool and disks is such as to prevent lateral shifting of the tool, thus holding the tool reliably in place. Preferably said arm is given a permanent tendency to assume a position raised or swung away from the supporting-disks C C by means of a spiral spring $D^2$, surrounding the rock-shaft $D'$ and connected with said shaft and the adjacent bearing $a'$. Said rock-shaft is provided at its end remote from the arm D with a rigid arm $D^3$, with which is connected a pedal link or connecting-rod $D^4$, through the agency of which (the said rock-shaft and the arm D) the roller C' is held downward against the tool B when the latter is resting on the lower or supporting disks.

The tubular disk-shaped tool is shown as made of two equal parts, being divided in the plane of the axis of the tool, whereby when the parts of the tool are slightly separated the work may be inserted radially from the periphery to the central bore of the tool. In some instances a single-piece disk provided with a radial slot extending from the periphery of the tool to its bore may answer the purpose. The tool is provided at its opposing side faces, around the central bore thereof, with milling-surfaces. As herein shown the milling-surfaces are formed on the ends of a centrally-located tube B', which extends through the central aperture of the disk and projects at the ends beyond both side faces thereof. Said tube is divided into two halves or parts, one part or half being fixed to one half of the disk and the other to the other. The parts of said tube are so related that when the two parts of the disk are brought together the two parts of the tube constitute a complete tube.

The milling-surfaces of the tool may be formed directly on the disk; but the arrangement shown is preferable, as it renders it practicable to make the principal part of the tool of a low-grade metal and not of extra-tempered steel, as is required for the part B', on which is formed the milling-surfaces. The two parts of the tool are firmly joined together by means of a latch consisting of a bar $b'$, which is connected at one end by a screw $b^2$ with one of said halves or parts and is provided at its other end with a slot through which extends a screw $b^3$, said screw entering a screw-threaded aperture in the other half or part of the tool. The slotted connection of said latch-bar with one of the parts of the tool permits said two parts of the tool to be slightly separated, when the screw $b^3$ is loosened and without the necessity of removing said screw. When the two parts of the tool are thus separated, a radial slot is formed extending from the periphery to the lateral bore of the tool, through which the work may be inserted into said bore formed in the tube B' from the periphery of the tool. After the work had been inserted into the hollow milling-tool in the manner described the parts are locked together by the latch referred to.

In Fig. 3 is shown in dotted lines the closed or looped type-bar of the Oliver typewriting machine, an article upon which the milling machine or device is especially applicable to operate. Said bar embraces a rock-shaft E, by which the bar is rockingly mounted in the machine, and a continuous strip E', which is formed to constitute the loop of the bar and the closed end of which carries the type-head. In attaching the rock-shaft E to the ends of the strip E' of the loop the parts are soldered or brazed together, and the inner surfaces of the strip around the shaft come from the brazing or soldering operation in a roughened state. Inasmuch as these parts of the type-bar when the type-bars are assembled in the machine bear against the end surfaces of the bearings in which the rock-shafts are mounted and are thereby held from endwise movement, it is necessary that such roughened surfaces be smoothed before the bars are assembled in the machine. After the shaft E of the type-bar has been inserted into the hollow milling-tool and the parts of the tool are locked together the tool is placed upon the supporting-disks C C and the driving-disk C', which is being driven, is lowered upon the tool. In this manner a rotary movement is imparted to the tool, and during the rotation thereof the inner faces of the ends of the strip E' are pressed one at a time against the milling-teeth, and thereby smoothed or finished. The shaft E of the looped type-bar or other analogous part of another article which is being operated upon constitutes, in connection with the bore of the tool, a centering means whereby the work is centered and held in proper position relatively to the milling-surfaces. For this reason the ends of the bore of the tool at the ends of the tube are reduced in diameter so that the shaft E fits fairly close therein.

The milling-surfaces shown may be replaced by abrading or buffing surfaces, and the form of the tool may be varied to adapt the machine to such work so long as the essential features of the tool are retained. So far as is concerned the manner of rotating the tool, the said tool, whether it be designed for milling, abrading, or buffing work, may be of other form than hollow or tubular, as herein illustrated.

While the tool shown has oppositely-facing milling-surfaces at both sides, yet it will be obvious that for some uses the tool need have a milling-surface at one of its sides only.

I claim as my invention—

1. In a milling-machine, a rotative milling-tool provided with an annular, peripheral bearing-surface, with a central bore which extends therethrough and, around said bore, with a milling-surface, said tool being constructed for the admission of the work through the periphery of the tool radially into the bore thereof, means engaging the said annular peripheral bearing-surface of the tool for supporting the same, and a rotative driving member engaging the said peripheral bearing-surface of the tool for giving thereto rotative motion.

2. In a milling-machine, a rotative milling-tool provided with a central bore which extends therethrough and around said bore with a milling-surface, said tool being made of two separable parts to permit the insertion of the work into the bore of the tool, and means engaging the periphery of the tool for giving rotative motion thereto.

3. In a milling-machine, a rotative milling-tool provided with a central bore which extends therethrough and around its central bore with a milling-surface, said tool being made of two separable parts to permit the insertion of the work into the bore of said tool, means for locking the parts of said tool together, and means engaging the periphery of the tool for giving rotative motion thereto.

4. In a milling-machine, a milling-tool comprising a centrally-apertured disk which is divided in a plane parallel with its axis, a longitudinally-divided tube seated in said aperture and extending at its ends beyond the opposing side faces of the disk and provided at its ends with milling-surfaces, and means engaging the periphery of the tool for giving rotative motion thereto.

5. In a milling-machine, a milling-tool comprising a centrally-apertured disk, a tube extending through the aperture of said disk and projecting at its ends beyond the opposing faces of the disk, and provided at its ends with milling-surfaces, said disk and tube being constructed for the admission of work radially into the central tube from the periphery of the disk, means for supporting the same engaging the periphery of the disk, and a rotative driving member engaging the periphery of the disk for giving rotative motion thereto.

6. In a milling-machine, a milling-tool comprising a disk which is centrally apertured to receive the work and is divided in a plane parallel with its axis, a milling-surface on the disk, a latch hinged to one of the parts of said disk and removably connected with the other part thereof, and means engaging the periphery of the tool for giving rotative motion thereto.

7. In a milling device, the combination with a milling-tool comprising a disk having a central aperture and provided around said aperture with a milling-surface, means whereby the work may be inserted into said aperture radially from the periphery of the tool, rotative supporting-disks with which said tool has peripheral engagement and upon which it is supported, and a driving-disk also having peripheral engagement with said tool.

8. In a milling-machine, the combination with a circular milling-tool provided with a milling-surface, supporting-rollers with which the tool has peripheral engagement and by which it is supported, a driving-disk having peripheral engagement with said tool, an arm in which said driving-disk is mounted, a rock-shaft rigid with said arm, means for rocking said shaft to move the driving-disk toward and away from the supporting-disk, a spring applied to said rock-shaft tending to normally hold said driving-disk away from the supporting-disk, and an arm adapted for connection with treadle or the like for depressing the driving-disk.

In testimony that I claim the foregoing as my invention I affix my signature, in presence of two witnesses, this 19th day of October, A. D. 1903.

STEPHEN HORR.

Witnesses:
EMIL ARNOLD,
THERON L. KNAPP.